(No Model.)

A. J. GARY.
WINDMILL ATTACHMENT.

No. 259,526. Patented June 13, 1882.

WITNESSES:
Francis McArdle
C. Sedgwick

INVENTOR:
A. J. Gary
BY
Munn & Co
ATTORNEYS.

United States Patent Office.

ALBERT JUDSON GARY, OF DENISON, IOWA, ASSIGNOR TO HIMSELF, HENRY S. GULICK, AND EDWARD S. PLIMPTON, OF SAME PLACE.

WINDMILL ATTACHMENT.

SPECIFICATION forming part of Letters Patent No. 259,526, dated June 13, 1882.

Application filed April 12, 1882. (No model.)

*To all whom it may concern:*

Be it known that I, ALBERT JUDSON GARY, of Denison, Crawford county, Iowa, have invented a new and Improved Windmill Attachment, of which the following is a full, clear, and exact description.

This invention consists of a rotary transmitting attachment to windmills, whereby the rotary motion of the wind-wheel may be directly transmitted in a manner to avoid the crank-motion commonly used, whereby better results are to be obtained, both as to the steadier and smoother action and less wear and friction, which also renders the machine more durable, all as hereinafter more fully described, and pointed out in the claim.

Reference is to be had to the accompanying drawings, forming part of this specification, in which similar letters of reference indicate corresponding parts in both the figures.

Figure 1:
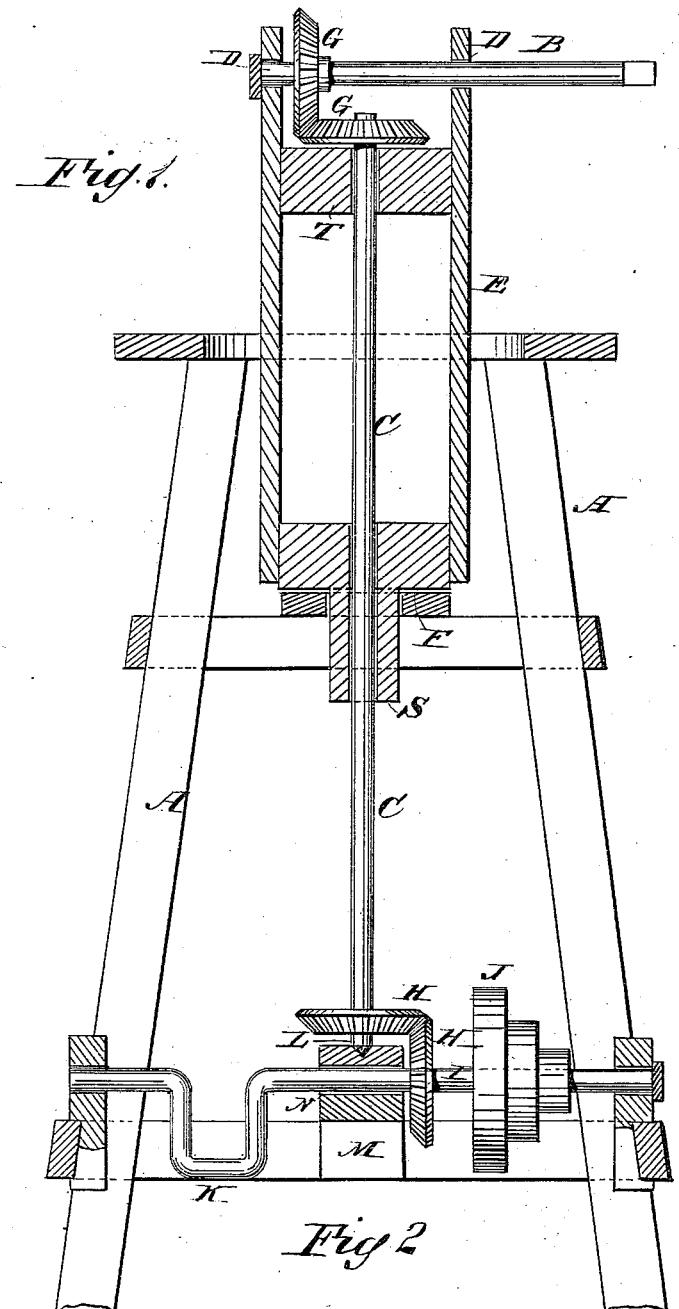
Figure 2:
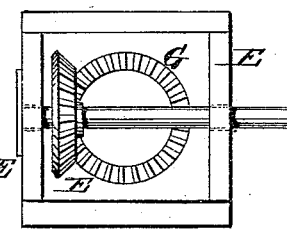

Figure 1 is a sectional elevation of my improved windmill attachment, and Fig. 2 is a top view of the rotary-gear connection with the wind-wheel shaft.

The tower A may be of any approved construction, and the wheel, which is not here shown, may also be of any desired construction suited to work on the horizontal shaft B, which traverses the axis of the upright shaft C, and has bearings D each side of said shaft in the top of the wheel-supporting frame E, which is mounted on a bearing, F, below the top of the tower, so as to revolve about the shaft C, for the wheel to shift around with the wind.

The said shaft B gears with the upright shaft C by a pair of bevel-wheels, G, to impart the rotary motion of the wind-wheel to the said shaft, and said shaft C gears in like manner by bevel-wheels H with the horizontal shaft I, from which the motion is to be transmitted by cone-pulleys J, crank K, or by other approved means, according to the requirements of the case, the pulleys J being for a rotary motion and the crank K for working a pump or other device requiring reciprocating motion. The shaft C has a step at L in a block, M, which is also made to serve for the bearing N of the horizontal driving-shaft I. Besides bearing F frame E has a sleeve extension, S, at the lower end, extending through bearing F along the shaft C, and it also has a bearing, T, on the shaft at the upper end of the latter for its support, to enable it to carry the wind-wheel shaft.

Having thus described my invention, I claim as new and desire to secure by Letters Patent—

The combination, with the tower A and the shaft I, provided with cone-pulley J and crank K, of the revolving frame E, provided with the sleeve extension S and bearings D T, the wheel-shaft B, the vertical shaft C, and the gear-wheels G H, substantially as and for the purpose set forth.

ALBERT JUDSON GARY.

Witnesses:
 WILL F. McHENRY,
 ALFRED A. SEAGRAVE.